United States Patent [19]
Iwasaki

[11] Patent Number: 6,109,816
[45] Date of Patent: Aug. 29, 2000

[54] STABILIZER LINK ROD, AND METHOD OF MANUFACTURING SAME

[75] Inventor: Kenichiro Iwasaki, Kanagawa-ken, Japan

[73] Assignee: Bridgestone Corporation, Tokyo, Japan

[21] Appl. No.: 08/940,134

[22] Filed: Sep. 29, 1997

[30] Foreign Application Priority Data

Sep. 30, 1996 [JP] Japan ................................. 8-278777

[51] Int. Cl.$^7$ .................................................... F16C 11/06
[52] U.S. Cl. ......................... 403/135; 403/122; 403/134
[58] Field of Search ................................. 403/135, 140, 403/122, 134, 133, 132, 50, 51, 141, 142, 143

[56] References Cited

U.S. PATENT DOCUMENTS

| | | | |
|---|---|---|---|
| 4,410,295 | 10/1983 | Ersoy et al. ............................... | 403/122 |
| 4,568,216 | 2/1986 | Mizusawa et al. ...................... | 403/143 |
| 4,904,107 | 2/1990 | Fukukawa et al. ................. | 403/135 X |
| 4,954,006 | 9/1990 | Suzuki et al. ............................ | 403/135 |
| 5,092,703 | 3/1992 | Kobayashi ............................... | 403/122 |
| 5,152,628 | 10/1992 | Broszat et al. ....................... | 403/135 X |
| 5,352,059 | 10/1994 | Ueno et al. ............................... | 403/122 |
| 5,427,467 | 6/1995 | Sugiura ..................................... | 403/140 |
| 5,489,161 | 2/1996 | Sugita et al. ......................... | 403/119 X |
| 5,564,853 | 10/1996 | Maughan ............................. | 403/135 X |
| 5,601,378 | 2/1997 | Fukukawa et al. ................. | 403/135 X |
| 5,611,635 | 3/1997 | Schutt et al. ........................ | 403/122 X |
| 5,752,780 | 5/1998 | Dorr ........................................ | 403/135 |
| 5,782,573 | 7/1998 | Dorr et al. ............................... | 403/135 |
| 5,813,789 | 9/1998 | Prickler et al. .......................... | 403/135 |

FOREIGN PATENT DOCUMENTS 5-319062  12/1993  Japan .

Primary Examiner—Harry C. Kim
Attorney, Agent, or Firm—Jordan and Hamburg LLP

[57] ABSTRACT

A stabilizer link rod for linking to suspension arm the stabilizer rotatably fitted to the chassis of a car. The link rod comprises a rod, a socket provided at either end of the rod and having a bore with at least one opening, bearing provided in the bore of the socket, and a ball stud of which a spherical head is grasped in the bearing. Further, the rod and sockets at the opposite ends of the rod are integrally molded in a synthetic resin, and the bearing is molded in a synthetic resin having a good sliding property.

4 Claims, 12 Drawing Sheets

STABILIZER LINK ROD, AND METHOD OF MANUFACTURING SAME

BACKGROUND OF THE INVENTION

1. Field of the Invention

The present invention relates to a stabilizer link rod for linking to a suspension arm a stabilizer rotatably installed to the chassis of an automobile, and a method of manufacturing the stabilizer link rod.

2. Description of the Prior Art

In automobiles, a stabilizer uses a torsion bar spring between the suspension arm and chassis in such a manner as to create a moment against a rolling of the automobile chassis and not to act as spring against a vertical oscillation of the chassis to reduce the rolling of the chassis, for thereby improving the running stability. Generally, the stabilizer is a U-shaped bar of which the central portion is made of a torsion bar spring. Opposite ends of the stabilizer are used as arms. Each of the end arms is installed to the suspension arm by means of a ball joint, and the central portion of the stabilizer is installed rotatably to the car chassis by means of a rubber cushion or bush.

A ball joint used for installing each end arm of the stabilizer to the suspension arm namely, stabilizer link rod, has a structure shown by way of example in FIG. 1. In this prior-art stabilizer, a steel connecting rod 100 has a steel socket 101 fixed (welded) to either end thereof as shown. The socket 101 is open at both the top and bottom thereof and has an annular abutment 101a at the top thereof. The socket 101 has fitted therein a synthetic resin-molded ball seat or bearing 103. A ball stud 102 is fitted at a spherical head 102a thereof in the synthetic resin-molded ball seat or bearing 103. The bearing 103 is open at the top thereof and has a bottom 103b. The bearing 103 abuts at a top end face 103a thereof upon the annular abutment 101a of the socket 101. The socket 101 is closed at the bottom thereof with a plate 104 fixed to the bottom end by caulking. Thus the bearing 103 is pressed by the closing plate 104. One of the ball studs 102 of the ball joint is linked to the end arm of the stabilizer while the other ball stud 102 is linked to the suspension arm, so that input from the wheel is transmitted to the stabilizer.

The steel socket 101 welded to each end of the prior-art steel rod 100 is usually formed by cold forging. Since the rod and socket are made of steel, the stabilizer cannot have a reduced weight. Further, the socket has to be joined to the rod by welding. Therefore, the manufacturing costs for the prior-art stabilizer cannot be reduced.

The bearing 103 of the prior-art stabilizer is molded as a whole in a synthetic resin. To grasp the head 102a of the ball stud 102 in the bearing 103. the bearing 103 is deformed with the closing plate 104 which is fixed later, or the socket 101 is deformed by caulking. Therefore, it is difficult to grasp the head 102a in the bearing 103. The bearing 103 may possibly be damaged or degraded in property as the case may be.

Furthermore, it is difficult to reduce the weight of the prior-art stabilizer since the rod 100 and socket 101 are made of steel. Also, an additional work is necessary to close the bottom opening of the socket 101 with the plate 104.

Moreover, a dust cover 105 is finally installed to the socket 101. One end of the dust cover 105 is secured to the outer top perimeter of the socket 101 using a C-shaped clip, caulking ring or the like. Therefore, installing the dust cover 105 leads to an increase of manufacturing steps and parts and thus to an increase of manufacturing cost. Since the socket 101 is made of steel, it increases the weight of the stabilizer. A lighter stabilizer has been desired.

SUMMARY OF THE PRESENT INVENTION

Accordingly, the present invention has an object to provide a stabilizer link rod having a reduced weight while maintaining a sufficient strength and easy to manufacture with a reduced number of manufacturing steps and less costs and also a method of manufacturing the stabilizer link rod.

The above object can be accomplished by providing a stabilizer link rod comprising a connecting rod, a socket provided at at least one of the opposite ends of the rod and having a bore with at least one opening, a bearing provided in the socket, and a ball stud of which a spherical head is grasped in the bearing, the rod and socket at the end of the rod being integrally molded in a synthetic resin and the bearing being molded in a synthetic resin which has a good sliding property. Also, the above object can be accomplished by providing a method of manufacturing the stabilizer link rod comprising a step of molding the bearing having a spherical bore by injection of a synthetic resin having a good sliding property, a step of housing the spherical head of the ball stud together into the spherical bore of the bearing, a step of setting the bearing and the ball stud grasped in the bearing into an injection mold, and a step of molding a socket around the bearing by injection of a synthetic resin into the injection mold and molding the rod which is joined to the socket.

According to the present invention, the rod and the socket at at least one end of the rod are integrally molded in a synthetic resin, and the bearing is molded in a synthetic resin having a good sliding property. Use of the synothetic resins permits to reduce the weight of the stability as a whole. Also by using the injection mold, the rod and socket can be formed easily and with a predetermined accuracy of dimensions. Because of the good sliding property of the bearing, the ball stud can be moved smoothly. Since the bearing and socket are formed separately from each other, they can be molded in different synthetic resins, respectively, which have desired properties, and also they can be freely designed. By adjusting the injection pressure when molding the socket by injecting the synthetic resin around the bearing set in an injection mold, the ball stud grasped in the bearing can be moved optimally, thereby permitting to produce a stabilizer having a stable property.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
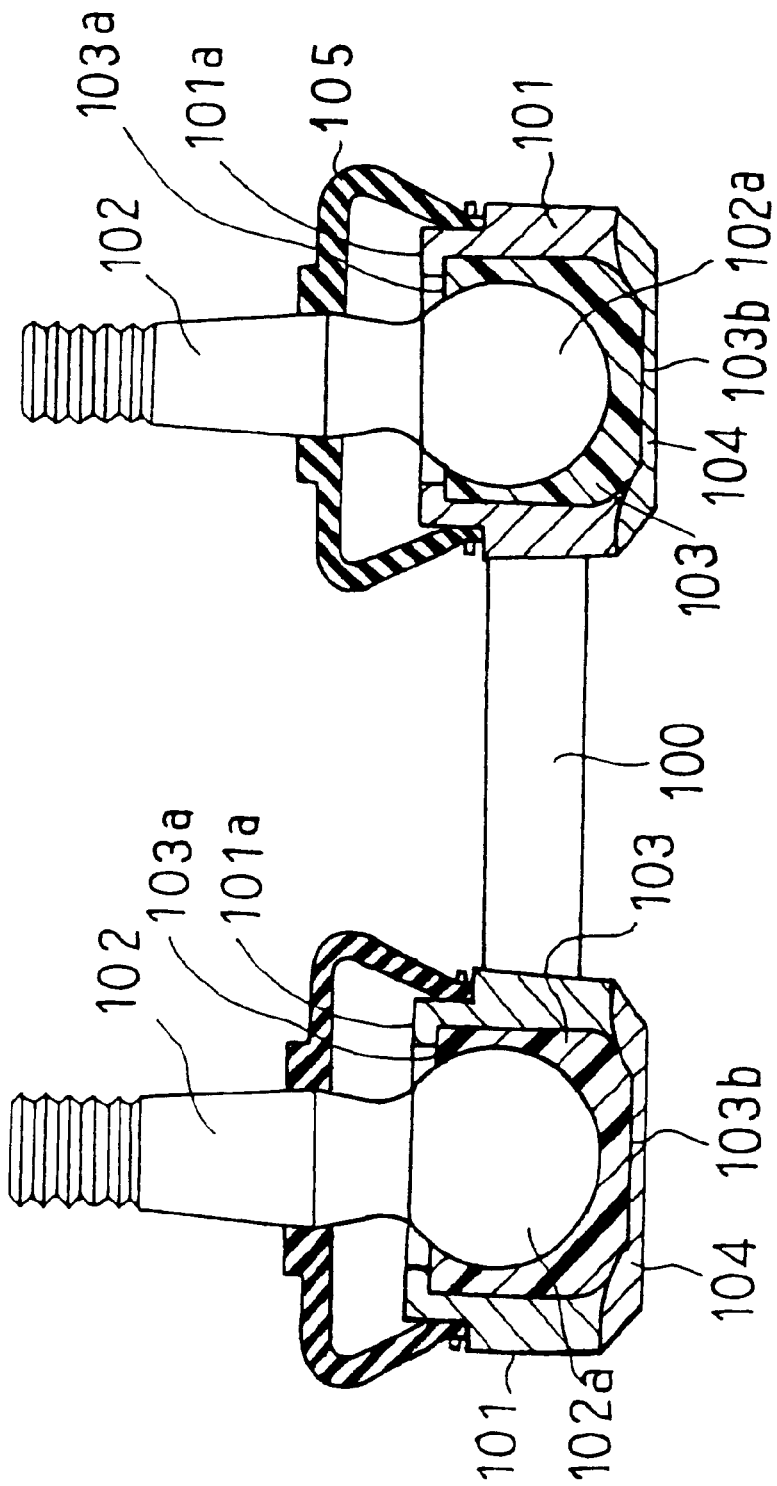
FIG. 1 is a sectional view of a prior-art stabilizer link rod.

The first embodiment of the present invention comprises a rod 1 having provided at either end thereof a socket 3 with a bore 2 having at least one opening 2A. The socket 3 has provided in the bore 2 thereof a bearing 4 in which a spherical head 5A of a ball stud 5 is rotatably fitted. Also there is provided on the top end of the socket 3 a dust cover 6 which is to be fitted on the top end of the socket 3 and the ball stud 5 to prevent dust and dirt from entering the moving area (ball joint) of the spherical head 5A. The dust cover 6 is fitted at the top thereof on a shaft 5B of the ball stud 5 and at the bottom thereof on the upper outer perimeter of the socket 3 with a C-shaped clip 7. The ball stud 5 has formed on the upper outer perimeter of the shaft 5A an external thread 5C which is to be linked to a suspension arm (not shown).

The rod 1 and the sockets 3 provided at the opposite ends of the rod 1 are integrally molded in a synthetic resin. The synthetic resin for the rod 1 and sockets 2 should preferably be polyacetal in which glass fibers are mixed. The mixture can be easily molded using an injection mold which will be further described later. The bearing 4 should preferably be molded in polyacetal in which no fibers such as glass fiber are mixed. Any other synthetic resin may be used to mold the bearing so long as it has a good sliding property, abrasion resistance and dimensional stability. The material for the rod 1 and socket 3 should desirably be made of a fiber-reinforced resin since they should be sufficiently strong. In this respect, nylon or the like is suitably usable as a material for the rod 1 and socket 2 besides the above-mentioned polyacetal.

Figure 2:
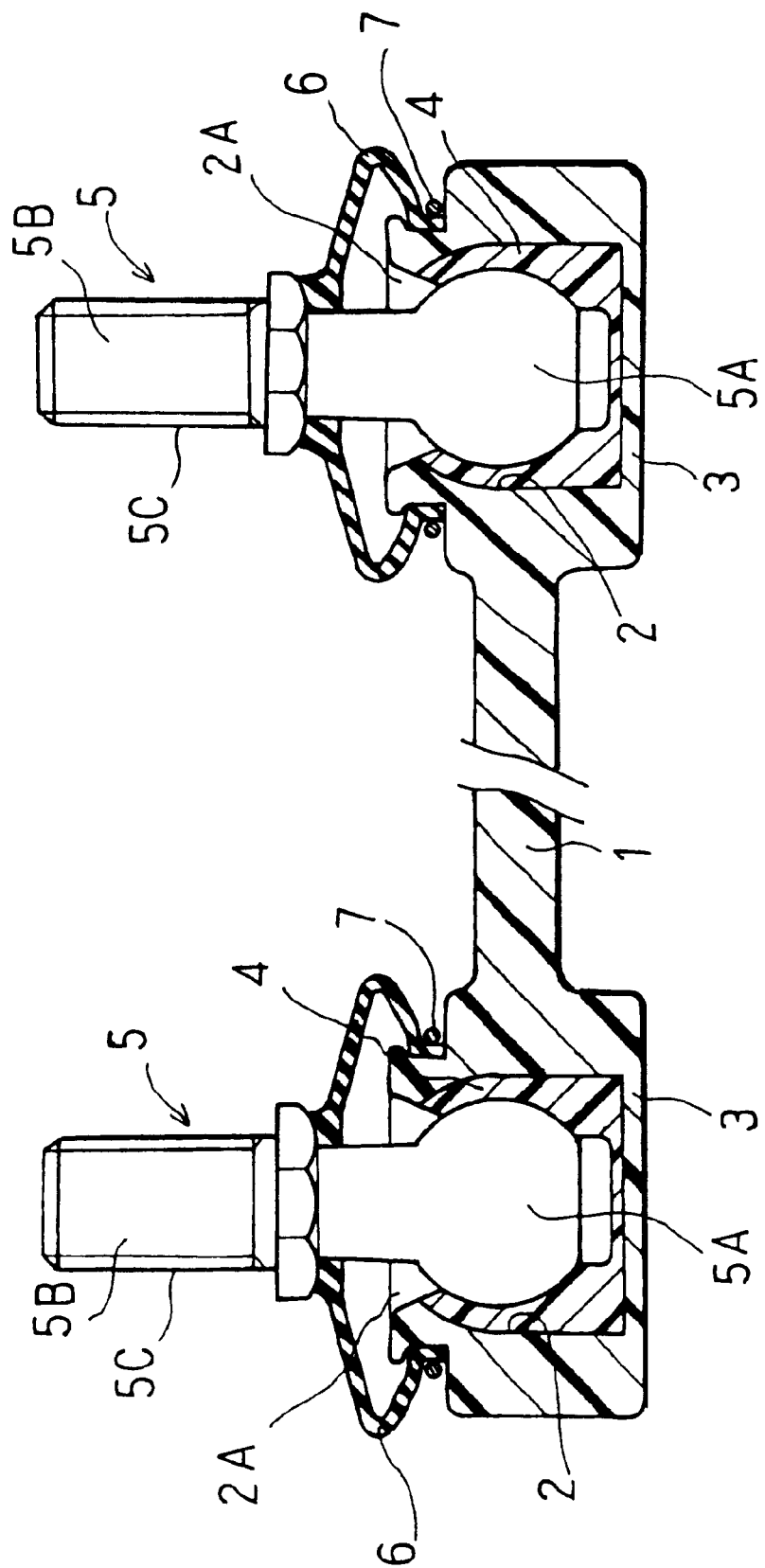
FIG. 2 is a sectional view of a first embodiment of the present invention.
Figure 3:
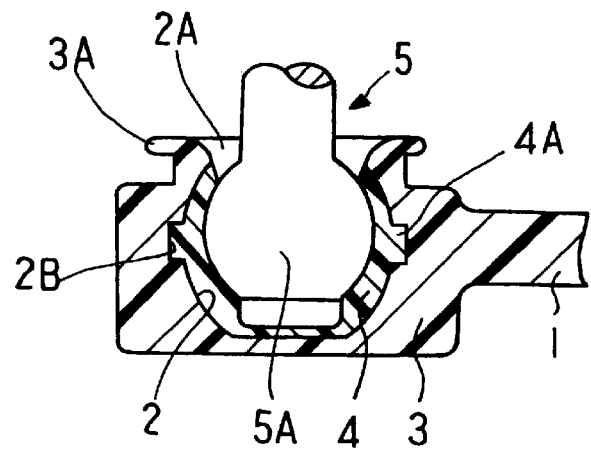
FIG. 3 is a sectional view of an example in which a projection in formed on the outer perimeter of the bearing.

FIG. 3 shows an example in which a projection 4A is formed on the outer perimeter of the bearing 4 in the first embodiment shown in FIG. 2 in such a manner that it can be fitted in a concavity 2B formed in the inner wall of the bore 2 of the socket 3. When the projection 4A is fitted in the concavity 2B, the bearing 4 is securely fixed in the socket 3.

FIG. 3 also shows a flange 3A formed on the outer perimeter of the opening 2A of the bore 2 of the socket 3. The flange 3A is provided to prevent the dust cover 6 from being disengaged from the socket 3 when the ball stud 3 oscillates or pivots.

Figure 4:
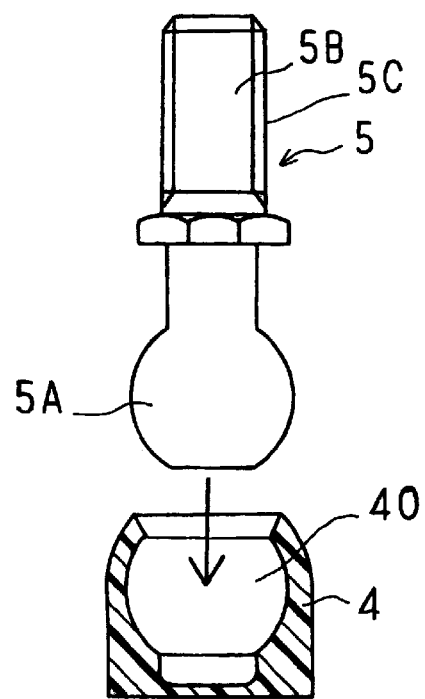
FIG. 4 is a sectional view showing the ball stud head going to be fitted into the bearing.
Figure 5:
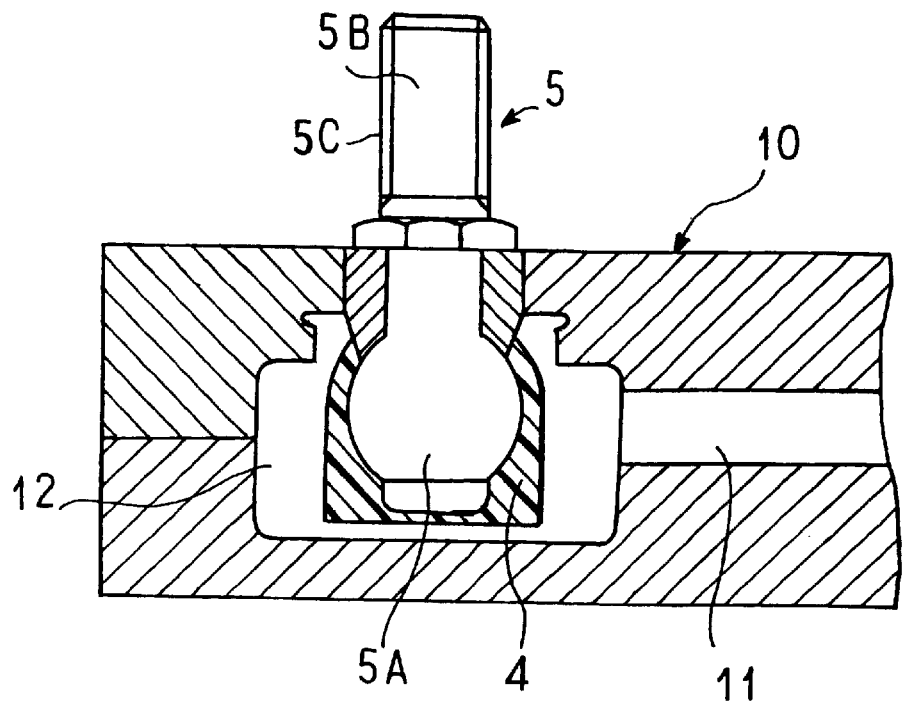
FIG. 5 is a sectional view showing the bearing and ball stud set in the injection mold.

FIG. 4 shows the spherical head 5A of the ball stud 5 going to be fitted into the spherical bore 40 of the bearing 4. The bearing 4 is injection-molded in a synthetic resin having a good sliding property such as polyacetal. The spherical head 5A of the ball stud 5 is force-fitted into the bore 40 of the bearing 4. The head 5A may be force-fitted into the bore 4 with the bearing 4 heated by beating. As shown in FIG. 5. the bearing 4 and ball stud 5 are set in an injection mold 19. A synthetic resin in injected into cavities 11 and 12 in the mold 10. The material injected into the cavity 12 is molded into the socket 3 around the bearing 4 while the material injected into the cavity 11 is molded into the rod 1. The cavities 11 and 12 communicate with each other. By adjusting the pressure of injection from appropriate places of the cavities 11 and 12. it is possible to adjust the engagement on the bearing 4 of the socket 3 formed around the bearing 4. The smoothness of pivoting of the head 5A of the ball stud 5 grasped in the bearing 4 can be thus adjusted.

Figure 6:
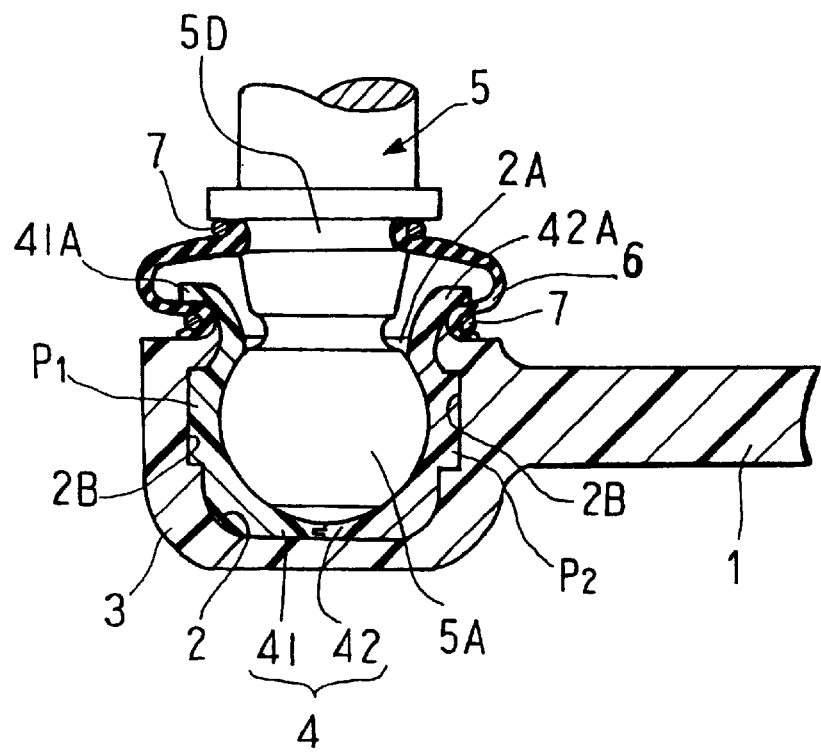
FIG. 6 is a sectional view of a second embodiment of the present invention.

FIG. 6 shows the second embodiment of the present invention in which the structure of the bearing 4 is improved. The bearing 4 is molded in a synthetic resin and consists of two parts 41 and 42. The parts 41 and 42 have projections P1 and P2 formed on the outer perimeters thereof, respectively. The projections P1 and P2 are fitted in concavities 2B formed in the inner wall of the bore 2 of the socket 3. More than two projections P1 should preferably be formed. This is also true for the projection P2. Correspondingly, so many concavities 2B should be formed as the projections P1 and P2. Each of top ends 41A and 42A at the open side of the parts 41 and 42, respectively, of the bearing 4 has an outer perimeter formed to receive one end of the dust cover 6. The ball stud 5 has a constricted neck 5D on which the other end of the dust cover 6 is to be fitted. The dust cover 6 is attached to the constricted neck SD and to; ends 41A and 42A with C-shaped clips 7, respectively.

Figure 7:
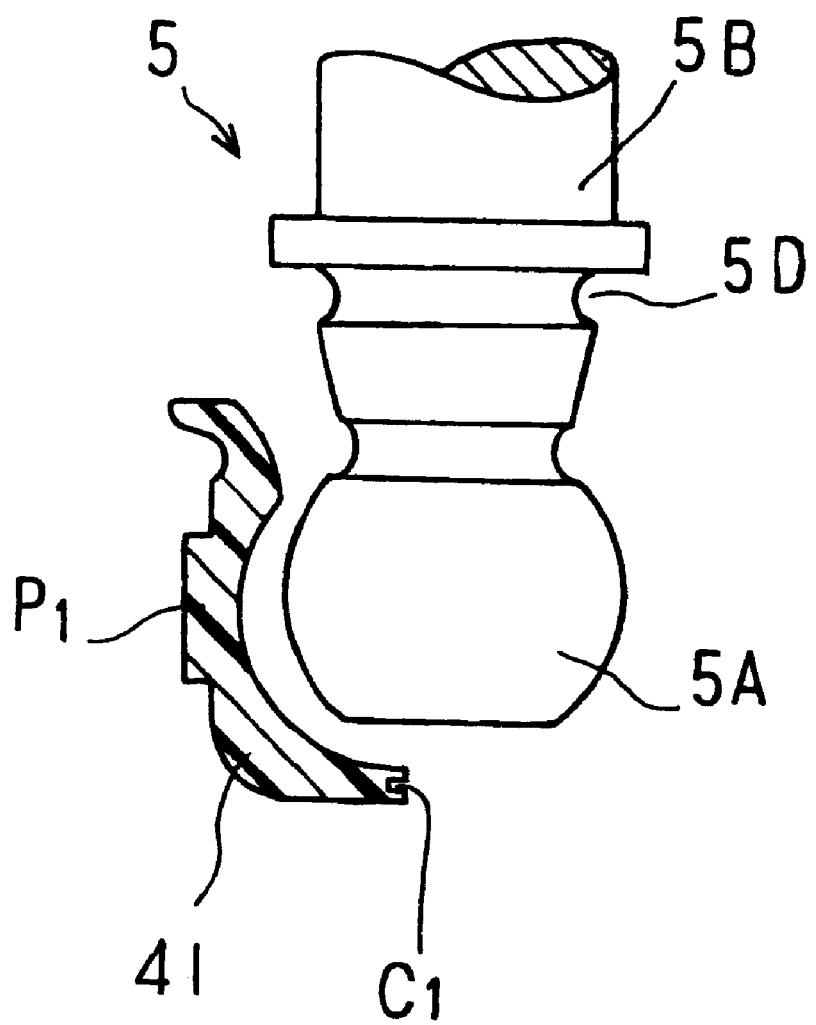
FIG. 7 is a sectional view of one part of the bearing going to be fitted onto the head.
Figure 8:
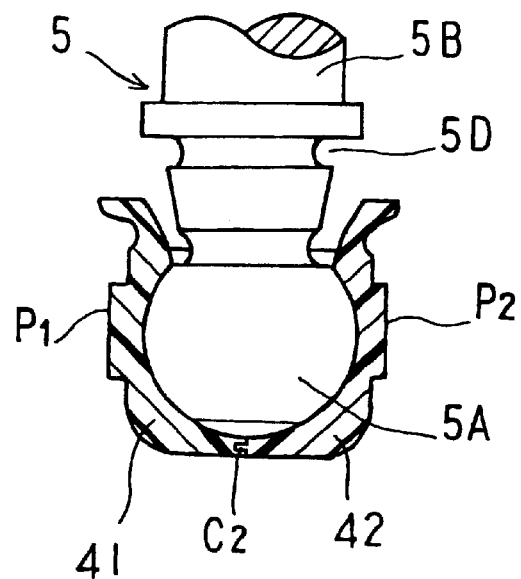
FIG. 8 is a sectional view of the head grasped by the bearing.
Figure 9:
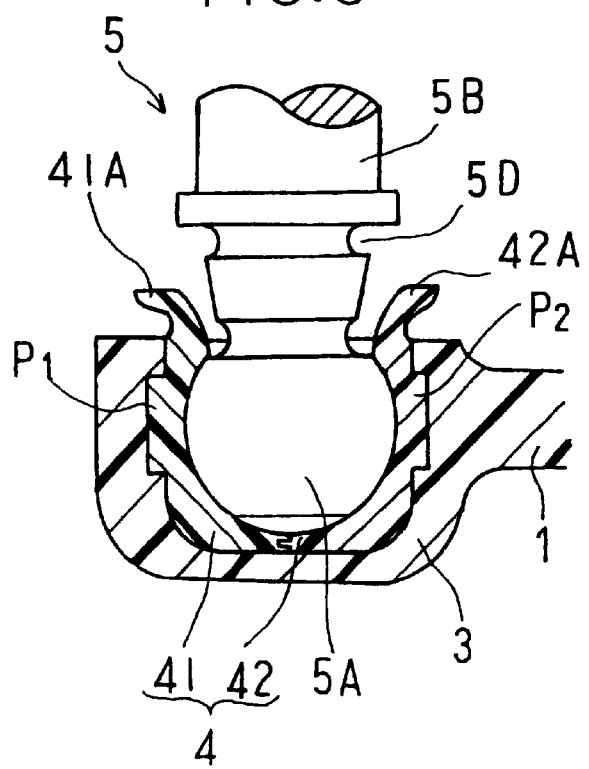
FIG. 9 is a sectional view of the bearing around which a socket is formed.

FIG. 7 shows how to hold the head 5A grasped in the bearing 4. First, the part 41 of the bearing 4 is attached to cover a half of the spherical surface of the head 5A of the ball stud 5. The part 41 has a concavity C1 formed therein. Next, the other part 42 is attached to cover the other half of the spherical surface of the head 5A and the projection C2 formed on the part 42 is fitted in the concavity C1 as shown in FIG. 8. The assembly shown in FIG. 8 is set in an injection mold 10, for example. The socket 3 is injection-molded around the bearing 4 and the rod 1 is also molded integrally with the socket 3. After the socket 3 is molded, the bearing 4 is blocked by the projections P1 and P2 from rotating inside the bore 2 of the socket 3 and from being disengaged upward from the opening 2A of the bore 2. When an assembly is completed as shown in FIG. 9. the dust cover 6 is fixed to the neck 5D of the ball stud 5 as well as to the outer perimeters of the top ends 41A and 42A with the C-shaped clips 7. respectively.

Figure 10:
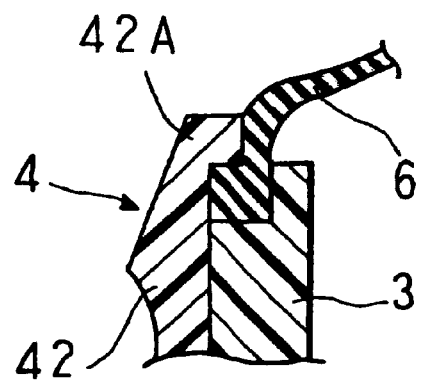
FIG. 10 is a sectional view showing another way of fixing the dust cover.
Figure 11:
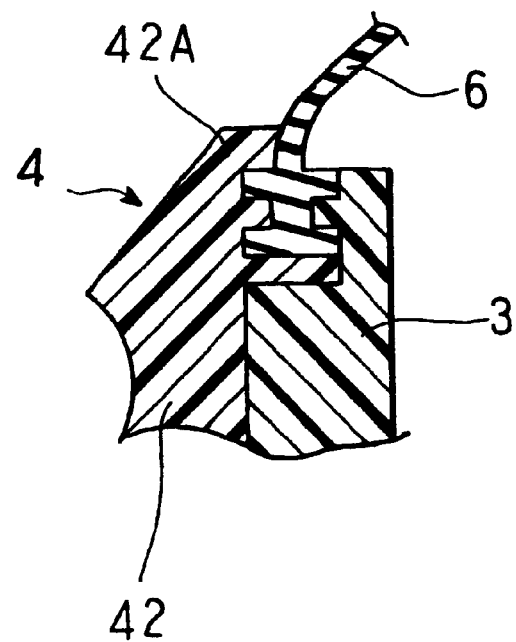
FIG. 11 is a sectional view showing a still another way of fixing the dust cover.
Figure 12:
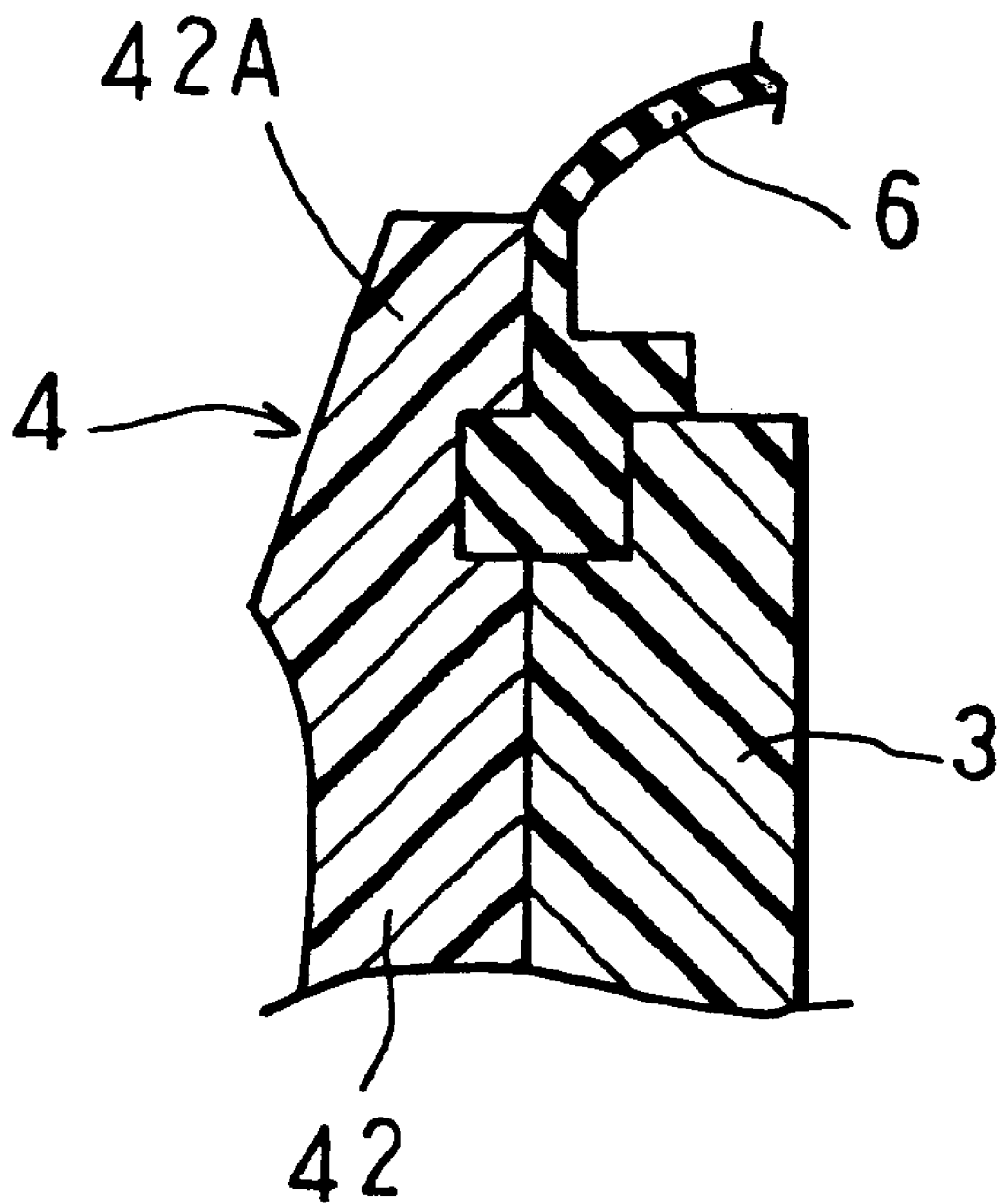
FIG. 12 is a sectional view showing a yet another way of fixing the dust cover.

FIG. 10 shows another manner of fixing the dust cover 6. In this case, the dust cover 6 is caught at one end thereof between the top end 42A (41A) of the part 42 of the bearing 4 and the top end of the socket. FIGS. 11 and 12 also show other ways of fixing the dust cover. Also in these cases, one end of the dust cover 6 is caught between the top end 42 (41A) and the top end of the socket 3.

Figure 13:
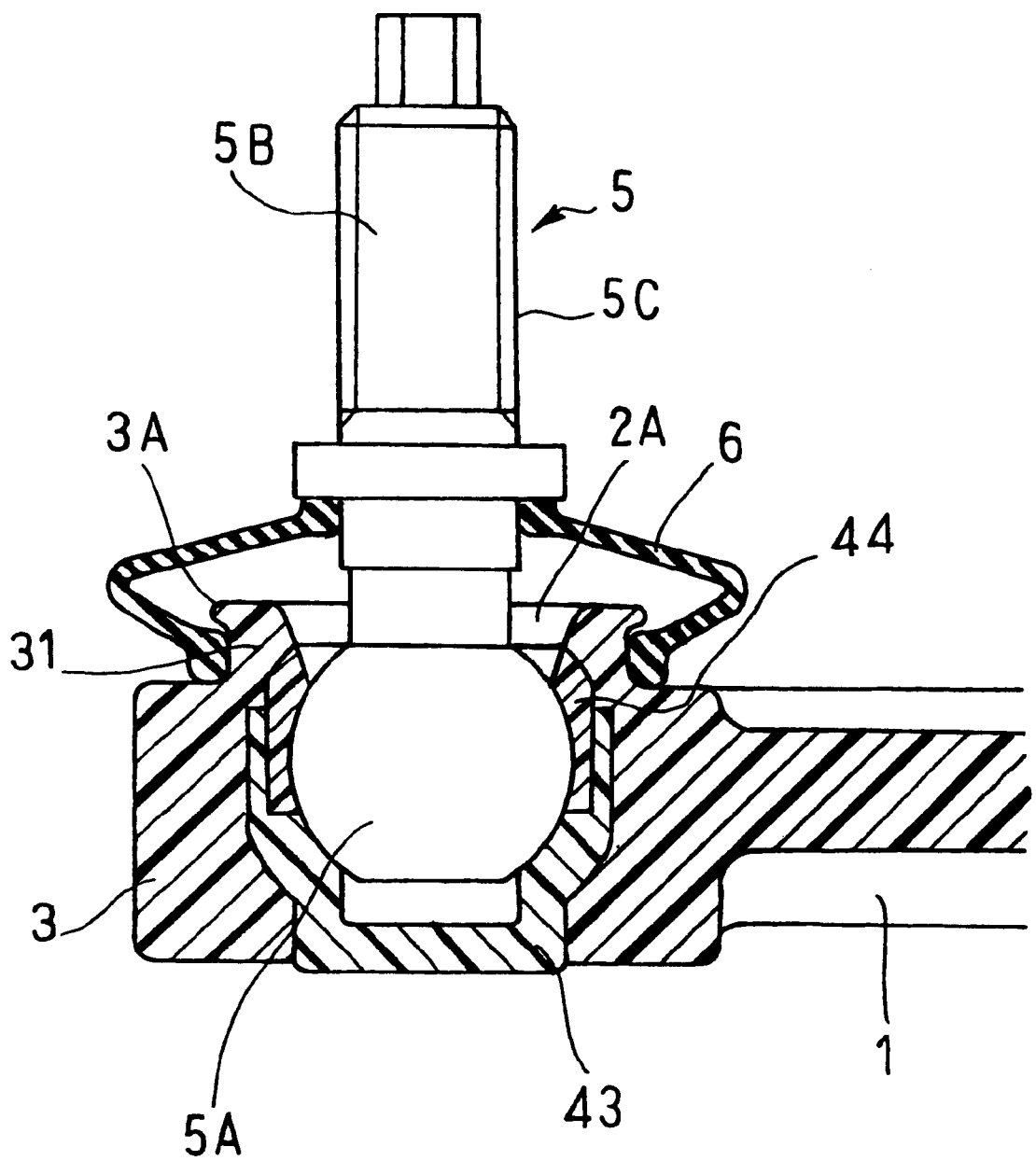
FIG. 13 is a sectional view of a third embodiment of the present invention.

FIG. 13 shows the third embodiment of the present invention. According to this embodiment, the bearing 4 consists of parts 43 and 44. The socket 3 is open at 2A (top thereof) as well as at the bottom thereof. The dust cover 6 is fitted at one end thereof on the outer perimeter of a neck 31 of the socket 3. The parts 43 and 44 are designed to vertically fit each other. The part 44 is fitted into the top of the part 43. The parts 43 and 44 grasp together the spherical surface of the head 45A.

In any of the embodiments shown in FIGS. 6 to 13, the bearing 4 consists of the two parts 41 and 42 or 43 and 44. However, the bearing 4 may consist of more than three parts.

As in the second and third embodiments shown in FIGS. 6 and 13, respectively, the bearing 4 consists of two or more parts molded in a synthetic resin. The parts are assembled together to grasp the spherical surface of the spherical head 5A. The socket 3 is molded in a synthetic resin to surround the bearing 4. Therefore, it is not necessary to force-fit the spherical head 5A of the ball stud 5 into the bearing 4, which will not possibly cause the bearing 4 to be damaged or degraded in characteristics but permit to grasp the head 5A in the bearing 4. The socket 3 is molded in a synthetic resin to surround the bearing 4. By inserting into the injection mold 10 the bearing 4 in which the head 5A is grasped, the socket 3 can be easily injection-molded around the bearing 4. Thus, the parts forming together the bearing 4 are securely joined to each other.

Figure 14:
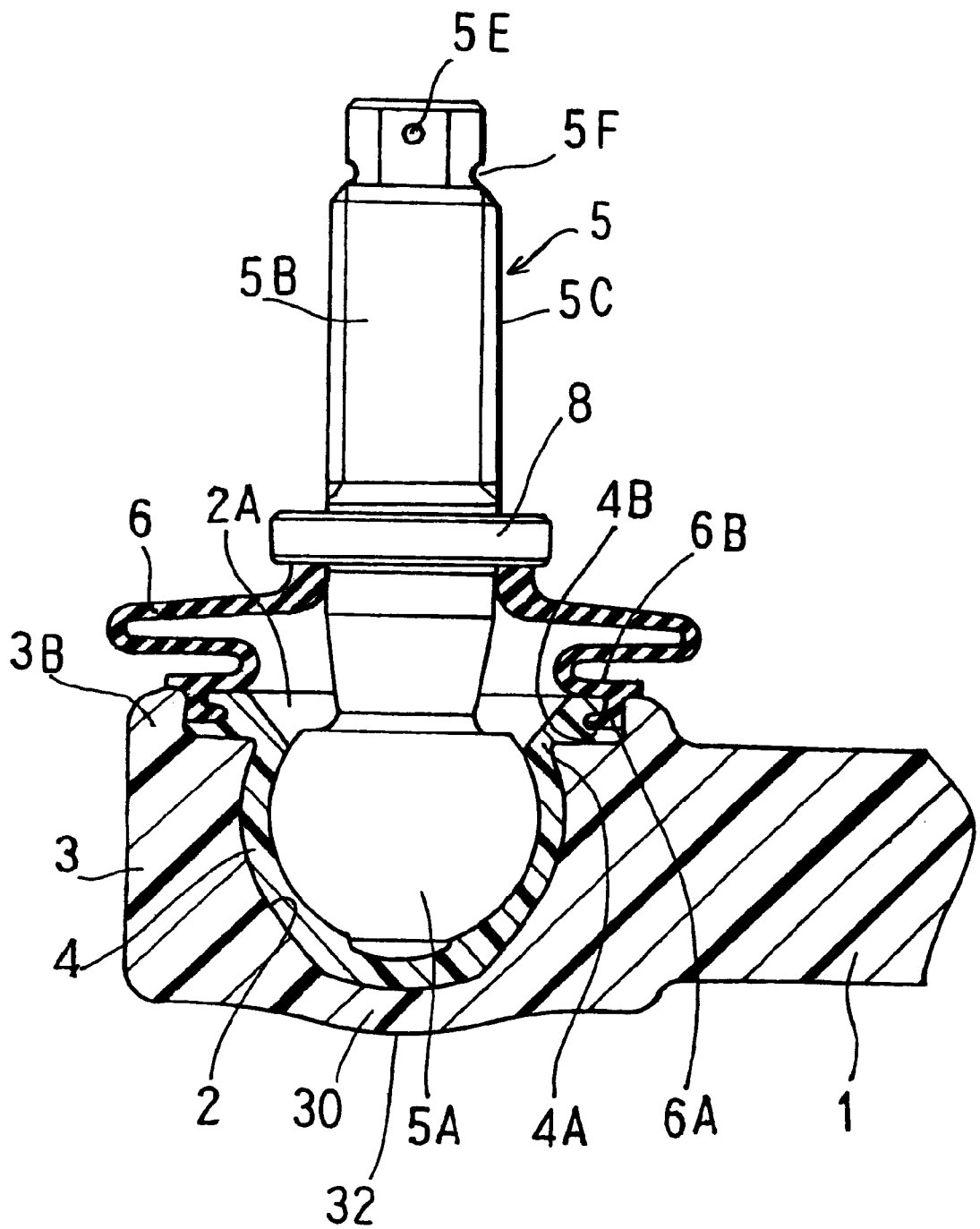
FIG. 14 is a sectional view of a fourth embodiment of the present invention.
Figure 15:
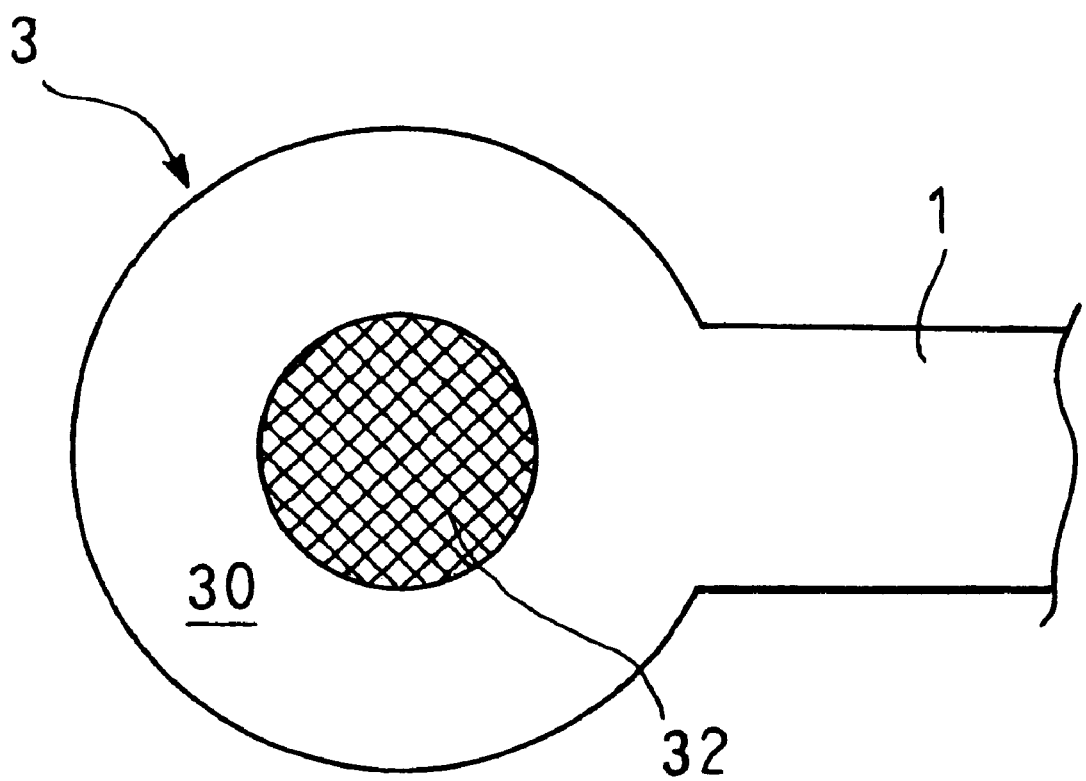
FIG. 15 is a bottom view of the socket shown in FIG. 14.

FIG. 14 shows the fourth embodiment of the present invention. According to this embodiment, before the rod 1 and socket 3 are being molded, the head 5A of the ball stud 5 is pushed into the bearing 4 and one end of the dust cover 6 is fitted onto the outer perimeter of the top end 4A of the bearing 4 while the other end of the dust cover 6 is fitted to the ball stud 5. With the assembly of the head 5A and bearing 4 set (inserted) into an injection mold, a synthetic resin is injected to around the bearing 4 to mold the socket 3. When the socket 3 is thus molded, the one end of the dust cover 6 is caught between the top end 4A of the bearing 4 and the top end 3B of the socket 3. The end of the dust cover is thus securely secured there. If the socket 3 has a flat bottom 30, the central portion of the socket 3 will be thinnest because the bottom of the bore 2 exists there. The thin portion will limit the flow of injected synthetic resin and cause a weld there. In the forth embodiment, the central portion of the bottom 30 is bulged downward as shown at 32 to provide a larger bottom thickness of the socket 3. The bulge 32 should preferably have a shape corresponding to that of the bottom of the bore 2. Designing of such a bulge 32 improves the flow of injected synthetic resin and causes no weld to take place there.

In the fourth embodiment shown in FIG. 14, the central portion of the bottom 30 of the socket 3 is bulged downward (as indicated with 32). So, the injected synthetic resin will smoothly flow through the central portion of the bottom 30 of the socket 3, which thus will cause no weld there. The socket 3 can be molded easily and will have a sufficient strength.

Figure 16:
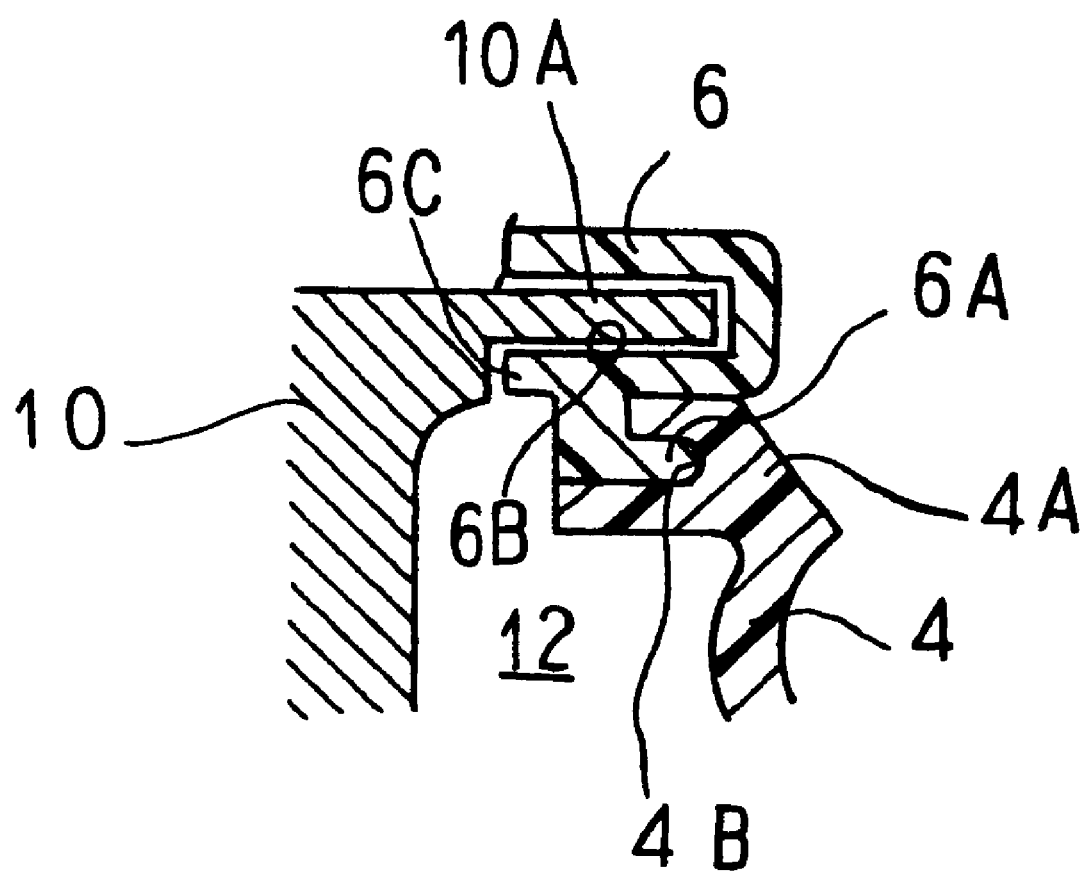
FIG. 16 is a sectional view of a fifth embodiment of the present invention.

FIG. 16 is a sectional view, enlarged in scale, showing the bearing 4 and dust cover 6 in the fourth embodiment shown in FIG. 14 set in the injection mold 10. As shown, the bearing 4 has formed in the top end thereof a groove 4B in which a projection 6A formed on one end of the dust cover 6 is fitted. Also, the dust cover 6 has an outwardly extending flange 6C formed on the one end thereof above the projection 6A. It should be noted that the projection 6A may be formed on the bearing 4 while the groove 4B may be formed on the dust cover 6.

To assemble the stabilizer link rod shown in FIG. 14, first the head 5A of the ball stud 5 is pressed into the bearing 4, then the projection 6A at the one end of the dust cover 6 is fitted into the groove 4B formed in the top end AA of the dust cover 6, and the other end of the dust cover 6 is fixed to the ball stud 5 with a ring 8. The assembly thus completed is set into the injection mold 10. FIG. 16 shows a positioning projection 6B formed on the dust cover 6 and a positioning recess 10A formed in the mold 10. The projection 6B is fitted into the recess 10A. A synthetic resin in injected into a cavity 12 of the mold 10 to the mold socket 3. Also, to prevent the bearing 4 and ball stud 5 from being rotated under the pressure of injection when the above assembly is set into the injection mold 10, either a positioning hole 5E or positioning recess 5F or both are formed on the top end of the ball stud 5 in addition to the positioning recess 10A and positioning projection 6B.

When the rod 1 and socket 3 are molded by injection molding, the injected synthetic resin will flow into a small clearance between the dust cover 6 and mold 10, possibly causing burrs which will injure the dust cover 6 when the ball stud 5 oscillates. Since the projections 6A and 6B are provided, however. burrs will be formed outside the dust cover 6 even if the flange GC is not provided on the dust cover 6. Such burrs will not possibly injure the dust cover when the ball stud 5 oscillates. In the example shown in FIG. 16, the boundary adjacent to the socket 3 and the mold 10 is also the outer perimeter end face of the flange 6C. In this case, burrs will take place at the boundary but will not injure the dust cover 6 when the ball stud 5 oscillates. If such flange 6C does not exist, the dust cover 6 will expand and shrink so that the burr will rub and injure the dust cover 6.

What is claimed is:

1. A stabilizer link rod, comprising:

a connecting rod;

a socket provided at at least one end of the connecting rod and having a bore with at least one opening, the connecting rod and the socket together comprising an integrally molded structure of synthetic resin;

a ball stud including a spherical head presenting a spherical surface; and a bearing comprised of molded synthetic resin provided in the bore of the socket, the bearing consisting of at least two separate parts each of molded synthetic resin and configured to graspingly engage the spherical surface of the spherical head of the ball stud, said integrally molded structure including a structural configuration of the socket for engaging said bearing in a manner captively retaining the bearing and the spherical head of the ball stud within the bore of the socket, said at least two separate parts including two halves which together form the bearing having bisected structure divided along an axis codirectional with a bore axis and including structure providing mutual cooperative engagement of the two halves when brought together such that the two halves are horizontally engageably fitted to one another about the spherical head of said ball stud receivably grasped therebetween.

2. A stabilizer link rod, comprising:

a connecting rod;

a socket provided at at least one end of the connecting rod and having a bore with at least one opening, the connecting rod and the socket together comprising an integrally molded structure of synthetic resin;

a ball stud including a spherical head presenting a spherical surface; and a bearing comprised of molded synthetic resin provided in the bore of the socket, the bearing consisting of at least two separate parts each of molded synthetic resin and configured to graspingly engage the spherical surface of the spherical head of the ball stud, said integrally molded structure including a structural configuration of the socket for engaging said bearing in a manner captively retaining the bearing and the spherical head of the ball stud within the bore of the socket, said at least two separate parts including two halves which together from the bearing having bisected structure divided along an axis codirectional to a longitudinal axis of the connecting rod such that the two halves are vertically fitted to one another about the spherical head of the ball stud receivably grasped therebetween, an inner surface defined by said two halves conforming to said spherical surface of the spherical head of the ball stud across a boundary defined by a junction of the two halves.

3. A stabilizer link rod as set forth in claim 2, wherein said structural configuration of the socket for engaging said bearing includes a concavity formed in an inner wall of the bore for fittably receiving a projection formed on an outer perimeter of the bearing.

4. A stabilizer link rod, comprising:

a connecting rod;

a socket provided at at least one end of the connecting rod and having a bore with at least one opening;

a bearing provided in the bore of the socket;

a ball stud including a spherical head which is grasped in the bearing; and a dust cover provided between a top end of the bearing and the ball stud to cover the at least one opening of the bore in the socket;

at least the socket being comprised of injection-molded synthetic resin;

the dust cover having formed at one internal perimeter end face thereof a projection which is fitted in a concavity formed at an outer perimeter end face of the bearing;

the dust cover having an outwardly extending flange formed at one end thereof above the projection; and a structural portion of said socket having an upper boundary extending up to an outer perimeter end face of the outwardly extending flange of the dust cover.

* * * * *